United States Patent
Newman (10) Patent No.: US 10,158,483 B1
(45) Date of Patent: Dec. 18, 2018

(54) SYSTEMS AND METHODS FOR EFFICIENTLY AND SECURELY STORING DATA IN A DISTRIBUTED DATA STORAGE SYSTEM

(71) Applicant: XANADU BIG DATA, LLC, Lexington, MA (US)

(72) Inventor: Rhys Andrew Newman, Perth (AU)

(73) Assignee: XANADU BIG DATA, LLC, Lexington, MA (US)

( * ) Notice: Subject to any disclaimer, the term of this patent is extended or adjusted under 35 U.S.C. 154(b) by 0 days.

(21) Appl. No.: 15/966,108

(22) Filed: Apr. 30, 2018

(51) Int. Cl.
| | |
|---|---|
| *H04L 9/20* | (2006.01) |
| *H04L 9/08* | (2006.01) |
| *G06F 21/60* | (2013.01) |
| *H04L 9/14* | (2006.01) |
| *G06F 17/30* | (2006.01) |
| *H04L 29/08* | (2006.01) |
| *H04L 9/32* | (2006.01) |
| *G06F 21/78* | (2013.01) |
| *H04L 29/06* | (2006.01) |

(52) U.S. Cl.
CPC ...... *H04L 9/0863* (2013.01); *G06F 17/30159* (2013.01); *G06F 17/30283* (2013.01); *G06F 21/602* (2013.01); *H04L 9/0819* (2013.01); *H04L 9/14* (2013.01); *H04L 9/3242* (2013.01); *H04L 67/1097* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,810,398 B2 | 10/2004 | Moulton | |
| 8,838,954 B2* | 9/2014 | Tian | H04L 9/00 713/150 |
| 2002/0003881 A1* | 1/2002 | Reitmeier | H04L 9/34 380/210 |
| 2005/0091545 A1* | 4/2005 | Soppera | G06F 21/64 726/19 |

(Continued)

OTHER PUBLICATIONS

Zing Database: high-perfomance key-value store for large scale storage service. Nguyen et al. Vietnam Journal of Computer Science. (Year: 2014).*

*Primary Examiner* — Venkat Perungavoor
(74) *Attorney, Agent, or Firm* — Womble Bond Dickinson (US) LLP; John J. Penny, Jr.

(57) ABSTRACT

The present disclosure discloses a method of storing data in a distributed data storage system, the distributed data storage system including a plurality of server and client nodes. The method includes receiving unencrypted data from a client node for storing at a server node. The received data is split into one or more data chunks of one or more sizes. Further, each data chunk is encrypted using a key based on the content of corresponding data chunk, and each encrypted chunk is stored at a memory of a server node using a unique data reference. Furthermore, an index chunk is formed that contains one or more data references of one or more encrypted chunks in a predefined order, along with one or more corresponding encryption keys of one or more encrypted chunks, which after being encrypted and stored, the corresponding data reference of this encrypted index chunk is provided to the client node.

17 Claims, 3 Drawing Sheets

(56) References Cited

U.S. PATENT DOCUMENTS

| | | | |
|---|---|---|---|
| 2005/0114666 A1* | 5/2005 | Sudia | H04L 9/3236 |
| | | | 713/175 |
| 2012/0054197 A1 | 3/2012 | San Martin et al. | |
| 2015/0310219 A1* | 10/2015 | Haager | G06F 21/602 |
| | | | 713/165 |
| 2017/0244685 A1* | 8/2017 | Mirza | H04L 63/061 |

* cited by examiner

Exemplary Environment

SYSTEMS AND METHODS FOR EFFICIENTLY AND SECURELY STORING DATA IN A DISTRIBUTED DATA STORAGE SYSTEM

TECHNICAL FIELD

The present disclosure generally relates to the field of data storage, and in particular to systems and methods for efficiently and securely storing data in a distributed data storage system.

BACKGROUND

Due to the ever increasing demand for data storage in today's digital world, distributed storage systems have received a lot of attention. In distributed storage systems, data as a whole or different portions of data are stored over several physically independent computer storage servers (also known as storage nodes). The total storage capacity of the distributed storage system is designed to be much greater than that of a single storage node.

There is an exponentially increasing amount of data produced and stored worldwide in distributed storage systems. A large fraction of that data is duplicated, for instance, as a result of unintentional copies of all or part of the data being stored multiple times, therefore leading to wasted storage resources. In particular, company/enterprise data, consisting mostly of structured formats such as documents and spreadsheets, is often replete with unnecessary duplicate data sometimes estimated over ~70%. Therefore, an enterprise-wide storage system can make significant space savings if the data can be de-duplicated and stored only once. However, in many distributed database systems, deduplication is difficult to implement as the data models supported by, for example, relational database management systems (RDBMS), are not designed with deduplication in mind.

File-system level deduplication products are alternatives that aim to work with raw data on disks underneath any higher level storage abstractions such as databases, thereby leaving the upper or higher layers to operate as normal (e.g., unaware of the deduplication process underneath it). However, it has been shown that file-system level deduplication does not lead to optimal storage resource savings (e.g., for databases, especially) as there are too many small changes (e.g., file headers, timestamps, etc.) that make blocks of data subtly different and thereby defeat deduplication efforts. File-system level deduplication can also introduce additional data loss risks, as the database on top can make incorrect assumptions about which critical data could be lost due to a physical disk error.

In view of the above, there is a need for efficient systems and methods for data storage that can overcome these challenges and store the data in a distributed storage system securely, reliably and with minimal duplication.

SUMMARY

An embodiment of the present disclosure provides systems and methods for storing data in a distributed data storage system, the distributed data storage system including a plurality of server and client nodes. The method includes receiving unencrypted data from a client node for storing at a server node. The received data is split into one or more data chunks of one or more sizes. Further, each data chunk is encrypted with a key based on the content of the corresponding data chunk and each encrypted chunk is stored at a memory of the server node referenced with a unique data reference. Furthermore, an index chunk is formed that contains one or more data references of one or more encrypted chunks in a predefined order, along with one or more corresponding encryption keys of one or more encrypted chunks, and a data reference of the index chunk is provided to the client node.

In some embodiments, a distributed database management system is provided for storing data in a distributed data storage system. The distributed data storage system includes a plurality of server and client nodes. The distributed database management system includes a data input module configured to receive unencrypted data from a client node for storing at a server node, a data splitting module configured to split the received data into one or more data chunks of one or more sizes, a data encryption module configured to encrypt each data chunk with a key based on the content of corresponding data chunk, a data storing module configured to store each encrypted chunk at a memory of the server node referenced with a unique data reference, an index chunk formation module configured to form an index chunk that contains one or more data references of one or more encrypted chunks in a predefined order, along with one or more corresponding encryption keys of one or more encrypted chunks; and a data output module configured to provide a data reference of the index chunk to the client node.

In some embodiments, a non-transitory computer readable medium is provided for storing data in a distributed data storage system. The distributed data storage system including a plurality of data storage nodes, the non-transitory computer readable medium comprising a set of instructions. The set of instructions when executed by a processor causes the processor to receive unencrypted data from a client node for storing at a server node; split the received data into one or more data chunks of one or more sizes; encrypt each data chunk with a key based on the content the corresponding data chunk, store each encrypted chunk at a memory of a server node referenced with a unique data reference; form an index chunk that contains one or more data references of one or more encrypted chunks in a predefined order, along with one or more corresponding encryption keys of one or more encrypted chunks; and provide a data reference of the index chunk to the client node.

DETAILED DESCRIPTION

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be thorough and complete, and will fully convey the scope of the present disclosure to those skilled in the art. Like numbers can refer to like elements throughout.

There are existing systems and methods that can use deduplication as a general compression of storage. For example, data domain deduplication can demonstrate challenges of implementing deduplication into mature RDBMS products. Some relevant concepts for deduplicating encryption have been provided. However, such approaches are partial and only focus on a single user (e.g., using the same password each time) to re-encrypt their files if the raw data is similar to a previous version.

File-system level deduplication products aim to work with the raw data on disks underneath the database systems, thereby leaving the databases to operate normally. However, it has been shown that this does not lead to optimal storage savings (e.g., for databases), as there can be too many small changes (e.g., file headers, timestamps, etc.) that make blocks of data subtly different, thereby defeating deduplication efforts. A file-system level also introduces additional data loss risks as the database on top ends up making incorrect assumptions about which critical data could be lost due to a physical disk error. Consider a "NoSQL" database that makes redundant copies to protect data in the case of hardware failure. If this NoSQL system believes 2 drives/folders have independent failure possibilities then it will report high durability to the user and other layers above it. However if in fact these 2 drives/folders are being compacted by a file-system technology "under the hood" then these 2 copies are actually only 1 physical copy. This 1 actual copy can now be lost with one single disk error, and therefore the data is not actually as durable as the NoSQL system thinks.

As described in further detail herein, in some embodiments, data as already-existing blocks that are previously stored can be built into the fundamental data model of an existing database system. Making data references the core "handle" with or through which to access data brings additional benefits to the system, including, for example:

With data references issued to clients, the database is free to move, split, compress and rework the data in the background as long as the original data is recoverable using the original reference. This allows the database to incrementally improve storage ratios using increasingly complex and sophisticated algorithms—typically in idle periods.

Clients are supplied with only references to data and know how ask for data using it. A data reference is a simple abstraction and clients can reason about the model themselves, thereby relieving the database of maintaining an unduly complex data structure.

Data can be deduplicated based on exact matching of block content. The storage server ID of the storage server on which to store data (or a series for redundancy) is in some embodiments based on the MD5 hash of the data content. Accordingly, storing or attempting to store the same data twice would involve asking the same server to perform the storage. The same storage server would thus check first to see whether there is already a data reference to the same data. Although the storage server ID can use a hash, when it checks whether the data is already stored thereon, it will double-check exact equals of all the bytes of the data to ensure that a problem would not arise from a hash collision. Importantly, the data reference can be large enough to account for situations where the data hash of two dissimilar data blocks are the same, such that a unique reference value can still be assigned thereto by the storage node so that data references can remain globally unique.

Data deduplication based on exact matching of block content, however, may be vulnerable to data bloating, for example, if two blocks (e.g., each 64 MB) differ only in the first byte. There is nothing special about which byte is different—any single byte can differ or even a range of bytes can be different. The point is that a fixed block size of 64 MB (or other size) will mean that blocks that are *almost* the same will still need to be stored nevertheless (data must be stored verbatim) and so there will be no space saving advantage. A block boundary that is flexible, defined by a content-derived value for example, will be able to "shift" boundaries along to find those blocks that are actually the same even though a few bytes here and there may differ. In this case the different bytes will need storing separately (in small blocks) and the bulk of the files (that share large regions of commonality) will benefit from the space saving of deduplication.

A commonly used scheme to help avoid such an obstacle is to have block boundaries defined by the content itself and no longer be fixed to some arbitrary design parameter. In this way, the data blocks include a range of byte positions at which they naturally break into repeating series of bytes, and blocks broken at these boundaries stand the highest chance of benefiting from deduplication. The content defined boundaries make it more likely common blocks in *almost* identical files of data will still be identified and stored efficiently with deduplication. Consider the following two sequences of data:

AABBBBBBAA00000FFF6AA6666AA6672
AABBBBBBAA00000FFF6AA668888AA6672
A content defined boundary that looks for two AAs together (for example) will break these into blocks as follows:
AABBBBBB AA00000FFF6 AA6666 AA6672
AABBBBBB AA00000FFF6 AA668888 AA6672
So the first 2 blocks in each file will be stored only once as they are identical. The last block too is the same and thus stored only once. The 3rd block is not identical and so both copies need to be stored, but in effect the second file can be stored with only 8 bytes (its unique 3rd block) rather than a full copy.

In some embodiments, a background compaction process can be built that rebalances block combinations based on global statistics of block frequencies. Embodiments of the present disclosure provide that a data chunk that originally occupied almost all of a block (e.g., a 64 MB block) can be more efficiently stored using deduplication, by storing the chunk as a set of references to smaller constituent chunks. In such cases, the content of the data chunk can be updated to become or include an "index" block identifying or corresponding to the smaller constituent chunks. A 64 MB block, for example, can thereby be moved from one region on a physical storage to a much smaller region. Consider the following reference that points to a block of data:
Reference (1234) --> AAAABBBBAAAABBB-BAAAABBBBAAAABBBBAAAABBBB
Any external client can ask the system for the value of reference 1234 and get the AAABBB....BBB data block back. However this data block is a simple repeated pattern of As and Bs, so a more efficient storage would be something like:
1 --> AAAA
2 --> BBBB
1234 --> *1212121212
Where the * symbol indicates that the block content has been replaced with references to the actual data (AAAA and BBBB in this case). The system will still return the expanded data to the client (it will do the extra lookups and retrieve the actual data and not report the lower level references to the client). This process can be repeated any number of times internally—the client only wants the original data back and does not care how to store it. The important feature is that there is an internal "reference type" marker that allows the system to know when the data returned from a simple 1 step lookup is actual raw data or another set of references it has to follow up.

To these ends, several data stores, each configured with different block sizes, can be provided to accommodate different data blocks with minimal wasting or misuse of storage space (e.g., 1 KB, 8Kb, 8 MB, 32 MB, 64 MB). That is, data compressed by secondary deduplication can be moved from one store to a smaller store (e.g., deleted from one date store after having been redundantly copied to the other data store), and the data reference can remain the same such that external clients can still retrieve the data using the original data reference. Notably, the data storage model of the present disclosure is composable, in that a collection of stores can be made to look or act like one single store albeit with additional features built in "under the hood".

Each data chunk can be encrypted based on the content of the data chunks. Each encrypted chunk can be stored using a corresponding data reference. Furthermore, an index chunk can be formed, containing the data references of the encrypted chunks in a predefined order, along with corresponding encryption keys of the encrypted chunks. By managing the encryption keys, a highly secure deduplicating storage system can be implemented.

Figure 1:
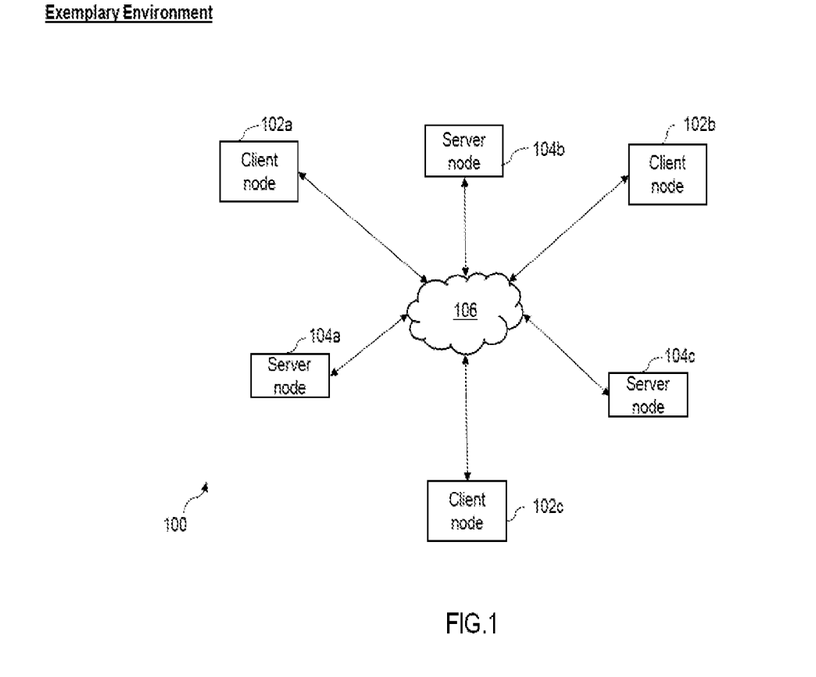
FIG. 1 illustrates an exemplary environment, wherein various embodiments of the present disclosure can be practiced.

FIG. 1 illustrates an exemplary environment 100, wherein various embodiments of the present disclosure can be practiced. The environment 100 includes first, second and third client nodes 102a, 102b and 102c (hereinafter, collectively referred to as "client nodes 102"), and first through third server nodes 104a to 104c (hereinafter, collectively referred to as "server nodes 104") communicatively coupled to each other through a communication network 106.

The communication network 106 may be any suitable wired network, wireless network, a combination of these or any other conventional network known to those of skill in the art. Non-limiting examples of the types of networks can include a Local Area Network (LAN), wireless LAN connection, an Internet connection, a point-to-point connection, or other network connection and combinations thereof. The communication network 106 may be any other type of network that is capable of transmitting or receiving data to/from host computers, storage devices, personal devices, telephones, video/image capturing devices, video/image servers, or any other electronic devices. Further, the communication network 106 may be capable of transmitting/sending data between the mentioned devices and others known to those of skill in the art. Additionally, the communication network 106 may be a local, regional, or global communication network, for example, an enterprise telecommunication network, the Internet, a global mobile communication network, or any combination of similar networks. The communication network 106 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The communication network 106 may include any software, hardware, or computer applications that can provide a medium to exchange signals or data in any of the formats known in the art, related art, or developed later. The number of client and server nodes 102 and 104 shown are exemplary in nature, more server nodes 104 can be added to the network as and when required to increase throughput and capacity. Each server node 104 as shown may have similar structural and functional details but may also differ from one another.

The client nodes 102 may be used by the users for their day-to-day tasks such as emails, web surfing, social networking, and the like. Non-limiting examples of the client nodes 102 include, but are not limited to, cell phones, personal digital assistants (PDAs), computers, servers, laptop computers, tablets, Internet appliances, smart phones, and mainframe computers. The server nodes 104 may be storage devices or a set of closely-linked database servers. Each server node 104 may be controlled by a person or organization. The server nodes 104 may store and process data in various forms, such as raw data (e.g., data collected from sensors, a traffic monitoring system, control systems, a surveillance system, a security system, a toll fee system or the like), processed data (e.g., metrics or other results generated from raw data, data aggregations, filtered data, etc.), developed content (e.g., documents, photographs, video, audio, etc.), and/or the like.

The client and server nodes 102 and 104, respectively, may be distributed geographically worldwide across different countries, different regions, different states, etc. The client nodes 102 may be located remotely from the server nodes 104. In some embodiments, some or all of the client nodes 102 may be located locally or geographically together or proximate to each other. The client nodes 102 may be configured to perform a number of transactions or operations such as creating, inserting, reading (e.g., querying or accessing), updating, deleting, and the like, as known to those skilled in the art. For example, the client nodes 102 may access data stored over the server nodes 104. In other examples, the client nodes 102 may write and read data to and from the server nodes 104. Further, the client nodes 102 may be used by one or more users for data retrieval. While, the client nodes 102 may be used by one or more "administrator" users for storage of data, creation of one or more data entries, or the like. In some embodiment, each server node 104 may be identified by a unique identifier (ID) (e.g., node ID) for identification by the client nodes 102.

In the context of the present disclosure, each client node 102 can execute a driver software library of the server nodes 104 loaded to connect to the server nodes 104 directly and store and access data in one of the server nodes 104. The client nodes 102 do not store any data permanently, but temporarily as a volatile cache. Further, two or more client nodes 102 may attempt to store the same data at a similar server node 104. Embodiments of the present disclosure provide methods and systems to avoid duplicate storage of data at a server node 104. For example, if the first client node 102a has stored a data file at the first server node 104a, and the second client node 102b also stores the similar data file at the first server node 104a, then the first server node 104a stores the data file in such a way that it is readily able to delete the copy of the data file already stored, thus eliminating duplicate storage of data.

Figure 2:
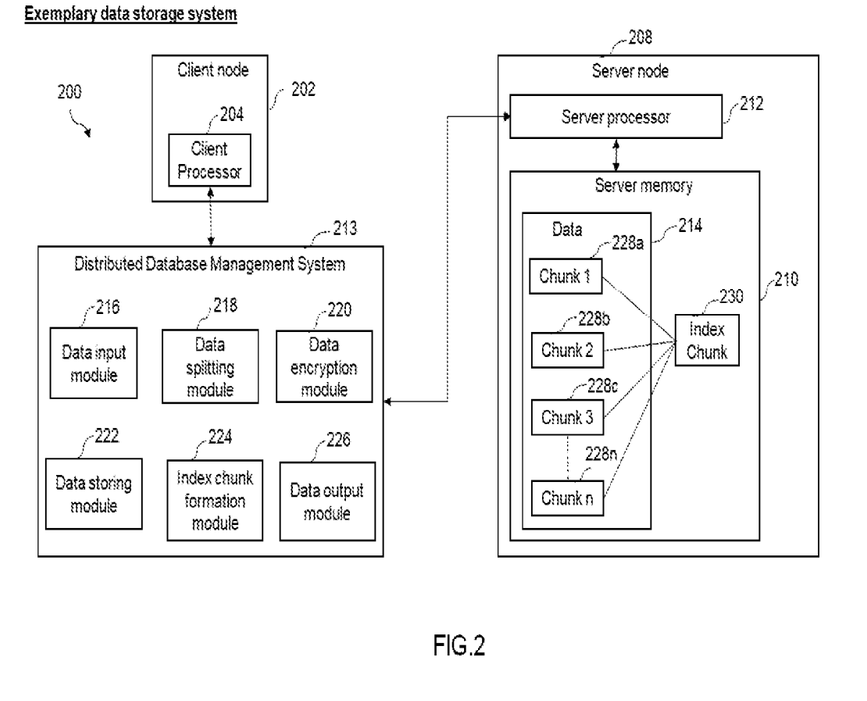
FIG. 2 illustrates an exemplary data storage system, in accordance with exemplary embodiments of the present disclosure.

FIG. 2 shows an exemplary distributed data storage system 200. The distributed data storage system 200 includes a client node 202 having a client processor 204, a server node 208 having a server memory 210 and a server processor 212, and a distributed database management system 213 for storing and managing a data file 214 of the client node 202 in the server memory 210.

The distributed database management system 213 includes a data input module 216, a data splitting module 218, a data encryption module 220, a data storing module 222, an index chunk formation module 224, a data output module 226, and a data deduplication module 228. Each of the components 216-228 may be implemented at the client node 202 or at the server node 208, or at another third party device in a single computing device or multiple computing devices connected to each other via a communication bus using known or later developed technology. However, for greater security reasons, encryption may take place at the client node 202, and the client node 202 shall send the encrypted content at the server node 208. It may be understood that in an exemplary embodiment, that the components 216-228 may include hardware components, while in another exemplary embodiment, the components 216-228 may include software entities/modules. In yet another exemplary embodiment, the components 216-228 may be a combination of hardware and software modules.

Although not shown, the client node 202 includes an input unit, a memory, and an output unit such as a display. The input unit, output unit, the memory and the client processor are components coupled to each other via a suitable bus or other known network protocol.

In some embodiments of the present disclosure, the client node 202 may consists of a core set of platform API definitions that are composable architecture elements in order to be integrated with other big data system elements such as IT infrastructure and data analytics to satisfy specific big data use requirements. The API can handle data store and retrieve requests received from the client node 202 and perform data store and retrieve operation at the server node 208. In some embodiments, the distributed database management system 213 may be implemented at the client node 202 using the core set of platform API definitions.

In operation, the client node 202 may request the server node 208 to store a data file, hereinafter referred to as data 214. This request is received by the data input module 216. In some embodiments, the request includes the data 214 in an unencrypted form along with a master key. In some embodiments, the request includes the data 214 in an unencrypted form without a master key.

The master key may be chosen by a user of the client node 202 at the start of the storage process, and can be different for different files. However a user may choose to use the same master key for a collection of files (e.g. files that relate to the same "project" as defined by their particular workflows).

The data splitting module 218 receives the data 214 and splits the data 214 into first through nth data chunks 228a to 228n (hereinafter collectively referred to as "data chunks 228") of varying sizes. The data chunks 228 may also be hereinafter referred to as data blocks. In an embodiment, the data splitting module 218 splits the data 214 into one or more data chunks 228 using a block boundary algorithm. The data 214 can be split into data blocks 228 at "content defined" boundaries. A content defined boundary is a function that operates on a moving window of a small number of bytes from the content and returns either "True" or "False". Ideally it will return "true" pseudo-randomly every N bytes (where N is the desired expected block length). The simple approach is to create a hash function that operates on 8 bytes in groups and the "true" is fired whenever the hash returns zero. A complex hash code is required to make these "zero outputs" sufficiently likely no matter what content is being considered (A simple formula is the "2 As in a row"). Boundaries can be defined in other ways—like size—but this then means small insertions of bytes here and there will change all the blocks of a file that is otherwise mostly the same. See the worked example above where a fixed boundary approach would mean all blocks following the alteration from 6666 to 668888 would be different and then all require storing:

AABBBBBBAA00000FFF6AA6666AA6672
AABBBBBBAA00000FFF6AA668888AA6672
Using blocks 10 long:
AABBBBBBAA 00000FFF6A A6666AA66 72
AABBBBBBAA 00000FFF6A A668888AA 6672

The first 2 blocks are the same in both files, but now blocks 3 and 4 on each are different and now need storing without getting any deduplication benefits. For a long file a single byte change at the beginning would result in all the blocks being different and require storing (no deduplication benefits). A content-based scheme avoids this problem.

In some embodiments, the data 214 may be split or divided into smaller data chunks 228 so that deduplication can more likely identify and/or exploit repetition. Each data chunk 228 may be "deduplicated" with the result that large numbers of data files that contain many repetitive sections will be stored efficiently (e.g., the same or substantially similar blocks stored only once). In another example, the data 214 may be broken into smaller data chunks 228 of varying sizes (e.g., ~1 MB, ~2 MB, ~4 MB . . . ~64 MB) that can be defined by content derived "boundaries".

The data encryption module 220 is configured to encrypt each data chunk 228 based on the content of corresponding data chunk 228. In some embodiments, each data chunk 228 is encrypted using a key generated based on content of the corresponding chunk, wherein the key is a secure hash value of corresponding content. This hash can be, for example, the MD5 hash of the content. For instance, the data chunk 228 might have a value A76767BBBFF8787AABCC (in Hex) which hashes can has, for example, to 287348AAB. In some embodiments, the encryption may be performed at either the client node 202 or at the server node 208. The client nodes 102 of the environment 100 (see, FIG. 1) use the same methodology to generate this content defined encryption key (e.g., MD5) or it may not be possible to make use of deduplication at the server node 208.

In some embodiments, each data chunk 228 may be compressed using one of many standard algorithms before encrypting and storing. This can reduce the storage requirements even further—as each block is compressed as well as using deduplication (e.g., it is stored only once).

The data storing module 222 is configured to store each encrypted chunk 228 in the memory 210 of the server node 208 using a corresponding unique data reference. The unique data reference corresponds to a hash code generated using a hashing algorithm on the data. Various examples of hashing algorithms include, but are not limited to, MD5, SHA-1, SHA-256, SHA-384 or a combination thereof. Thus, the server node 208 stores the data 214 in form of first through nth data chunks 228 (by default 64 MB) using a highly scalable, de-duplicated addressing system.

The index chunk forming module 224 is configured to form an index chunk 230 for storing in the server memory 210. The index chunk 230 contains data references of all the data chunks 228 in a predefined order, along with corresponding encryption keys. The order is the natural order of the original data 214 when divided up into chunks 228 for storage. The order is important and needed to recover the original data 214. It thus follows that the data chunks 228 have to be assembled in the correct order.

The index chunk forming module 224 is further configured to encrypt the index chunk 230 (e.g., before storing it in the memory 210 of the server node 208). In some embodiments, the index chunk 230 is encrypted using the master key before being stored at the server node 208. In some embodiments, the encryption is performed at the client node 202 using the master key only known to the client node 202. In some embodiments, the client node 202 discloses the master key to the server node 208, and the server node 208 performs the encryption of the index chunk 230 and forgets the master key. In some embodiments, the encryption of the index chunk 230 is performed at the server node 208, through a randomly generated master key. After performing encryption, the server node 208 provides the randomly generated master key to the client node 202, and forgets the master key, leaving only the client node 202 knowing it. The server node 208 need not remember the master key, or whether the master key is the same as other keys, and for the server node 208, the data chunks 228 are treated as just an opaque array of bytes. The server node 208 should not remember the master encryption key for the index chunk 230, even if it is told temporarily or it generates it as described. This is important to prevent the data being accessed by an unauthorized person—if the key is not stored on the server node 208, no attacker can get easy access to the (unencrypted) data by breaking into the storage nodes.

The data output module 226 is configured to provide a data reference of the index chunk 230 to the client node 202, so that the client node 202 may access the index chunk 230 whenever possible using the data reference, and later decrypt the same using the master key. Once the index chunk 230 is decrypted, the client node 202, can reconstruct the original data 214 by combining the data chunks 228.

If another client node stores the same data file that has been previously stored at the server node 208, then they are able to generate the same (content defined) encryption keys and produce identical encrypted data chunks. The deduplication module 228 can then use existing deduplication technologies on the encrypted content and thus space can be saved in the normal way. With the encrypted blocks being the same, deduplication within the server node 208 proceeds in the same way as for unencrypted blocks of data (e.g., the server node 208 makes no distinction—identical blocks, encrypted or not get the same references and are only stored once). Notably, only unique chunks of data (e.g., encrypted or otherwise) are stored, thus saving space.

In some embodiments, the data chunks 228 do not have to be the same size. It is possible to "seek" into a data file 214 using the index of the index chunk 230, i.e. skipping to a position (e.g., forward and backwards) without having to read all the data in between. The benefits of using non-uniform chunking means the most appropriate blocks can be derived (e.g. using the contend-defined boundary method above) in a way that maximises deduplication benefit (i.e., gets the blocks that are most common and most repeated). However with variable length blocks it is difficult to skip through to a specific place in a file—to get the 10234th byte you don't know which block to retrieve immediately, you have to read the blocks from the start of the file (and retrieve them from the database) and count the bytes until you get to the desired point. To fix this problem, an index block would record the references of each block (and the size of each of them) so it is simple to find the block that contains the 10234th byte by reading this single index block. Skipping to a point in a file then requires at worst 2 lookups (the index block and the resulting block required).

The index chunk 230 is the only thing the client node 202 has direct access to, so if the chunking strategy of the data file 214 is altered later (e.g., through background deduplication) then the index chunk 230 can be rewritten to "point" to the new set of improved deduplicated blocks without the client node 202 needing to be informed.

The indexing of chunks facilitates data chunks to be encrypted while still taking advantage of deduplication. As long as the data for storing is the same between two client nodes, the corresponding encrypted versions will be the same, and therefore can be deduplicated normally by the server node 208. Thus, the client node 202 can split the data into chunks before encryption (e.g., using a standard content-based boundary scheme) and then encrypts each chunk with a content based encryption key (e.g., typically based on the secure hash of the content). Sending this to the server node 208 will result in only unique (new) chunks being stored as clients that have previously stored the same data will have generated the same boundaries and the same encryption keys and therefore the same (encrypted) data chunks. The server node 208 can then return the unique data reference for these encrypted chunks and thus achieve deduplication efficiencies even with these encrypted data chunks.

Alternative compression schemes can be used transparently. For example, if a data chunk 228 is found to be compressible (e.g., using zip technologies or similar) then the compressed data chunk 228 can be stored and references (in the index chunk 230) updated to reflect this with the additional metadata that details the decompression method to be used during a reading process. This approach facilitates ongoing space saving inside the memory 210 in a way that can be done when the system is not under heavy load. If a reference has a "type" marker, it could indicate the data was generated by a function that could be executed on demand to return the bytes—for example, the data block: AAAABBBBAAAABBBBAAAABBBBAAAABBB-BAAAABBBB could be generated by a function that was simply "repeat AAAABBBB 5 times".

For blocks of data that compress well (using zip for example) the block could be safely replaced with the compressed data and a reference type marker that ensures the database will unzip the data block when returning the data to clients. This process allows even greater space savings, and as the compression is all done inside the database without any external client being aware of it, it can be termed "transparent compression".

The storage scheme of the present disclosure can protect against a number of threats, such as:
- Anyone reading the raw data stored in data chunks 228 would not be able to know the raw unencrypted content. Thus, even by knowing the hash mechanism used in encryption of data, one would not be able to generate the decryption key needed to read the raw chunk data.
- Without the master key, no-one can decrypt the index chunk 230. Thus, even if all of the data chunks 228 were decrypted, it would be extremely difficult to recover the data 214 originally stored by the client node 202 (as there is no list of ordered chunks the decrypted chunks would have to be reassembled from random order using guesswork).
- An attacker similarly cannot know which data chunks 228 were stored by which client node, as the presence of a chunk (even one that has been decrypted) does not have any "backlinks" to the index chunks that refer to it.

If the client node 202 forgets the master key, the original data file 214 cannot be decrypted by the system.

In some embodiments, the client node 202 holds a reference to the encrypted index chunk 230, and also the encryption key of the index chunk 230. The encryption key of the index chunk 230 is not stored at the server node 208, but is stored securely by the client node 202 elsewhere. The client node 202 retrieves the index chunk 230 from the server node 208 using the master key, decrypts the index chunk 230 with the master key, and asks the server node 208 for all of the data chunks for the raw stored data as listed in this (which are at that time unencrypted) index chunk 230. The index chunk 230 also contains the (content derived) encryption keys for each data chunk 228 so that the client node 202 can progressively decrypt each index chunk 230 as it receives it from the server node 208. The server node 208 does not seethe unencrypted data—it only responds to requests for data (e.g., via references) and it returns these data chunks 228 to the client node 202 without needing to understand or decrypt any of these chunks 228.

Figure 3:
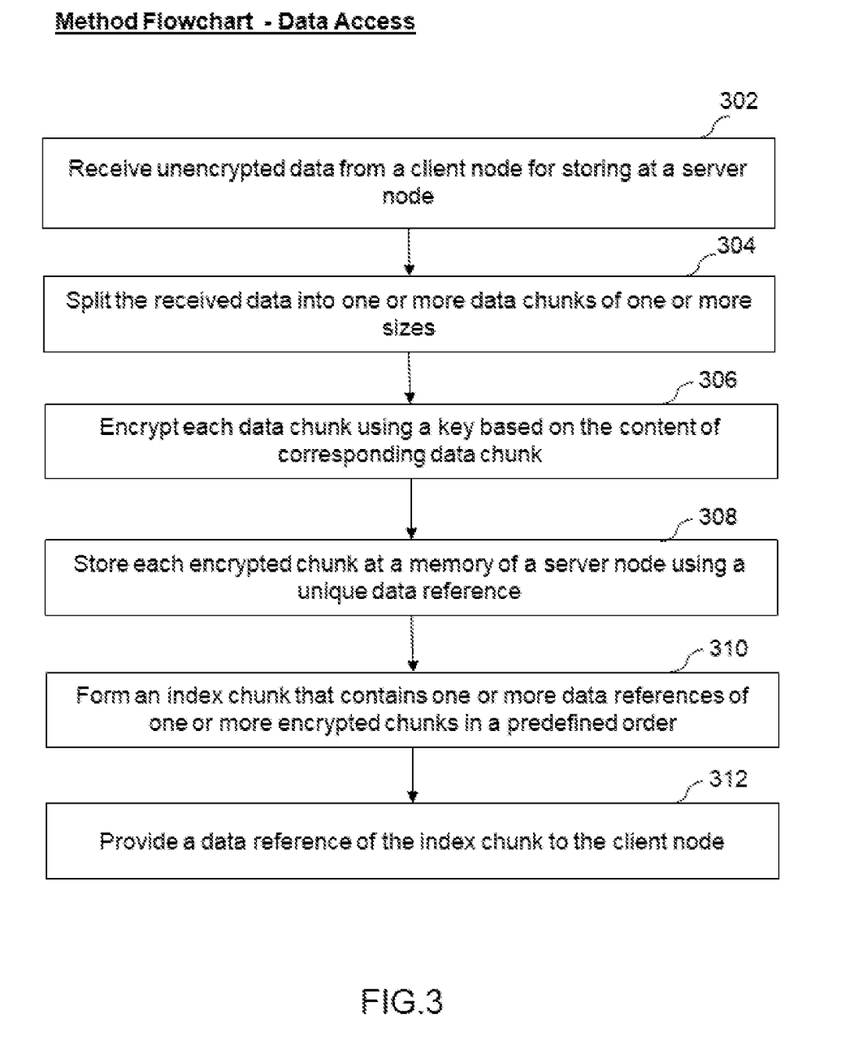
FIG. 3 is a method flowchart for storing data at a server node of the exemplary data storage system, in accordance with exemplary embodiments of the present disclosure.

FIG. 3 is an exemplary method flowchart for storing data in a distributed data storage system. The data storage system includes multiple data storage nodes. Various examples of the data storage nodes may be physical servers, for example. Each data storage node stores data in any formats such as comma-separated values, image file formats, plain text, audio file formats, Hypertext Mark-up Language (HTML), MS Word or the like. Each data storage node is represented by a unique node identification.

The method flowchart is implemented when a user performs a storing operation, such as storing data on a server node. The user can store data on the server node when required through the distributed database management system.

At 302, unencrypted data is received from a client node for storing at a server node.

At 304, the received data can be split into one or more data chunks of one or more sizes.

At 306, each data chunk can be encrypted based on the corresponding content. For example, each data chunk can be encrypted using a key based on content of corresponding chunk, wherein the key is based on a secure hash value of corresponding content.

At 308, each encrypted chunk can be stored at a memory of the server node referenced with a unique data reference. The unique data reference used for storing each encrypted chunk in the memory can be based on a hash of the encrypted content of the data chunk. If already some data is stored with the unique data reference, then the data may not be stored again at the server node, thereby reducing duplicate storage of similar data.

At 310, an index chunk can be formed that contains one or more data references of one or more encrypted chunks in a predefined order, along with one or more corresponding encryption keys of one or more encrypted chunks. The index chunk is encrypted using a master key known only to the client node.

At 312, a data reference of the encrypted index chunk can be provided to the client node, so that the client node can access the index chunk whenever possible.

The distributed database management system as described in the present disclosure or any of its components, may be embodied in the form of a computer system. Typical examples of a computer system includes a general-purpose computer, a sever computer, a programmed microprocessor, a micro-controller, a peripheral integrated circuit element, and other devices or arrangements of devices that are capable of implementing the method of the present disclosure.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive or embedded drive such as a solid state disk etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes, however, many variations to these can be implemented in order to detect objects (primarily human bodies) in video/image frames.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method of storing data in a distributed data storage system, the distributed data storage system including a plurality of server and client nodes, the method comprising: receiving unencrypted data from a client node for storing at a server node; splitting the received data into one or more data chunks of one or more sizes using a block boundary algorithm; encrypting each data chunk with a key derived from a password generated based on content of corresponding chunk, wherein the password is a secure hash value at of corresponding content; storing each encrypted chunk at a memory of the server node referenced with a unique data reference; forming an index chunk that contains one or more data references of one or more encrypted chunks in a predefined order, along with one or more corresponding encryption keys of one or more encrypted chunks; and providing a data reference of the index chunk to the client node.

2. The method of claim 1, wherein the data reference used for storing each encrypted chunk in the memory is based on a hash of the encrypted content of the data chunk.

3. The method of claim 1, further comprising receiving unencrypted data from the client node along with a master key.

4. The method of claim 3, further comprising: encrypting the index chunk with the master key; deleting the master key by the server node; and storing the encrypted index chunk at the server node.

5. The method of claim 1, further comprising: encrypting the index chunk by the server node with a randomly generated master key; providing the master key to the client node; deleting the master key by the server node; and storing the encrypted index chunk at the server node.

6. The method of claim 1, further comprising using deduplication on the encrypted content when a similar file is stored at the server node by another client node.

7. A distributed database management system for storing data in a distributed data storage system, the distributed data storage system including a plurality of server and client nodes, the distributed database management system comprising: a processor; a memory; a data input module configured to receive unencrypted data from a client node for storing at a server node; a data splitting module configured to split the received data into one or more data chunks of one or more sizes using a block boundary algorithm; a data encryption module configured to encrypt each data chunk with a key derived from a password generated based on content of corresponding chunk, wherein the password is a secure hash value of corresponding content; a data storing module configured to store each encrypted chunk at a memory of the server node referenced with a unique data reference; an index chunk formation module configured to form an index chunk that contains one or more data references of one or more encrypted chunks in a predefined order, along with one or more corresponding encryption keys of one or more encrypted chunks; and a data output module configured to provide a data reference of the index chunk to the client node.

8. The distributed database management system of claim 7, wherein the data reference used for storing each encrypted chunk in the memory is based on a hash of the encrypted content of the data chunk.

9. The distributed database management system of claim 7, wherein the data input module is further configured to receive unencrypted data from the client node along with a master key.

10. The distributed database management system of claim 9, wherein the index chunk formation module is further configured to: encrypt the index chunk with the master key; delete the master key by the server node; and store the encrypted index chunk at the server node.

11. The distributed database management system of claim 7, wherein the index chunk formation module is further configured to: encrypt the index chunk by the server node with a randomly generated master key; provide the master key to the client node; delete the master key by the server node; and store the encrypted index chunk at the server node.

12. The distributed database management system of claim 7, further comprising a deduplication module configured to use deduplication on the encrypted content when a similar file is stored at the server node by another client node.

13. A non-transitory computer readable medium for storing data In a distributed data storage system, the distributed data storage system including a plurality of data storage nodes, the non-transitory computer readable medium comprising a set of instructions, the set of instructions when executed by a processor causes the processor to: receive unencrypted data from a client node for storing at a server node; split the received data into one or more data chunks of one or more sizes using a block boundary algorithm; encrypt each data chunk with a key derived from a password generated based on content of corresponding chunk, wherein the password is a secure hash value of corresponding content; store each encrypted chunk at a memory of the server node referenced with a unique data reference; form an index chunk that contains one or more data references of one or more encrypted chunks in a predefined order, along with one or more corresponding encryption keys of one or more encrypted chunks; and provide a data reference of the index chunk to the client node.

14. The computer non-transitory computer readable medium of claim 13, wherein the set of instructions when executed by a processor further causes the processor to receive unencrypted data from the client node along with a master key.

15. The non-transitory computer readable medium of claim 14, wherein the set of instructions when executed by a processor further causes the processor to: encrypt the index chunk with the master key; delete the master key by the server node; and store the encrypted index chunk at the server node.

16. The non-transitory computer readable medium of claim 13, wherein the set of instructions when executed by a processor further causes the processor to: encrypt the index chunk by the server node with a randomly generated master key by the server node; provide the master key to the client node; delete the master key by the server node; and store the encrypted index chunk at the server node.

17. The non-transitory computer readable medium of claim 13, wherein the set of instructions when executed by a processor further causes the processor to use deduplication on the encrypted content when a similar file is stored at the server node by another client node.

* * * * *